Feb. 16, 1926.  1,572,982
N. A. BARGER ET AL
DEHORNING MECHANISM
Filed April 29, 1925   2 Sheets-Sheet 1

Inventors
N. A. Barger and
H. F. Barger
By CASnow & Co
Attorneys

Feb. 16, 1926. 1,572,982

N. A. BARGER ET AL

DEHORNING MECHANISM

Filed April 29, 1925   2 Sheets-Sheet 2

Inventors
N. A. Barger and
H. F. Barger

Attorneys

Patented Feb. 16, 1926.

1,572,982

UNITED STATES PATENT OFFICE.

NEWTON A. BARGER AND HARVEY F. BARGER, OF CEDAR VALE, KANSAS.

DEHORNING MECHANISM.

Application filed April 29, 1925. Serial No. 26,708.

*To all whom it may concern:*

Be it known that we, NEWTON A. BARGER and HARVEY F. BARGER, citizens of the United States, residing at Cedar Vale, in the county of Chautauqua and State of Kansas, have invented a new and useful Dehorning Mechanism, of which the following is a specification.

This invention aims to provide a novel means, adapted to be mounted through the instrumentality of a gate, on any dehorning chute, for the purpose of holding an animal which is to be deprived of its horns.

It is within the province of the disclosure to improve generally and to enhance the utility of devices of that type to which the invention appertains.

Although a preferred form has been shown, a mechanic, working within the scope of what is claimed, may make such changes as his skill may suggest, without departing from the spirit of the invention.

In the accompanying drawings:—

Figure 1:
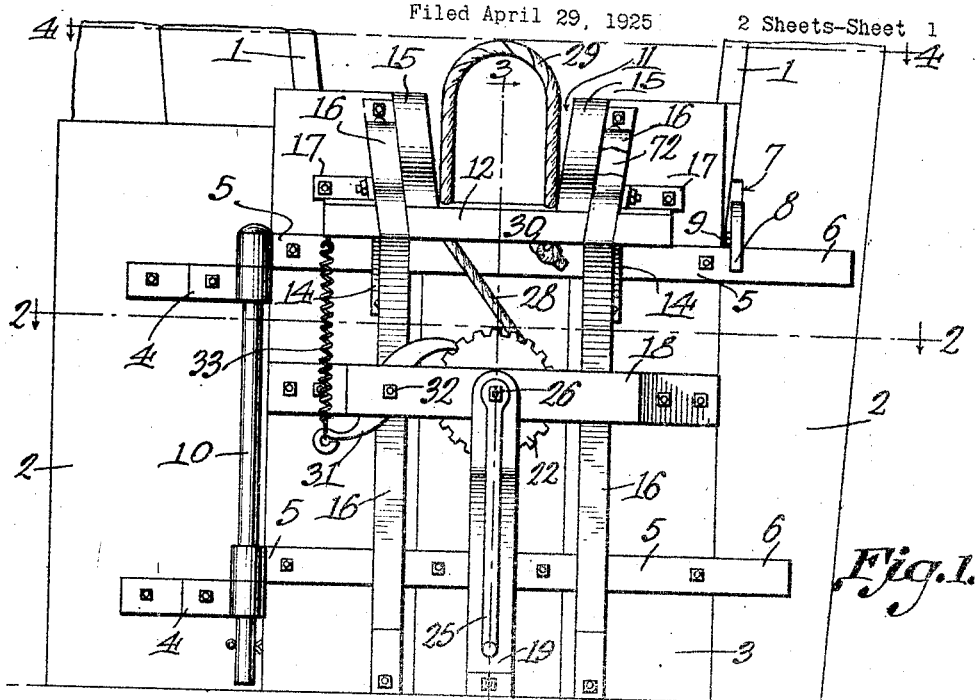
Figure 2:
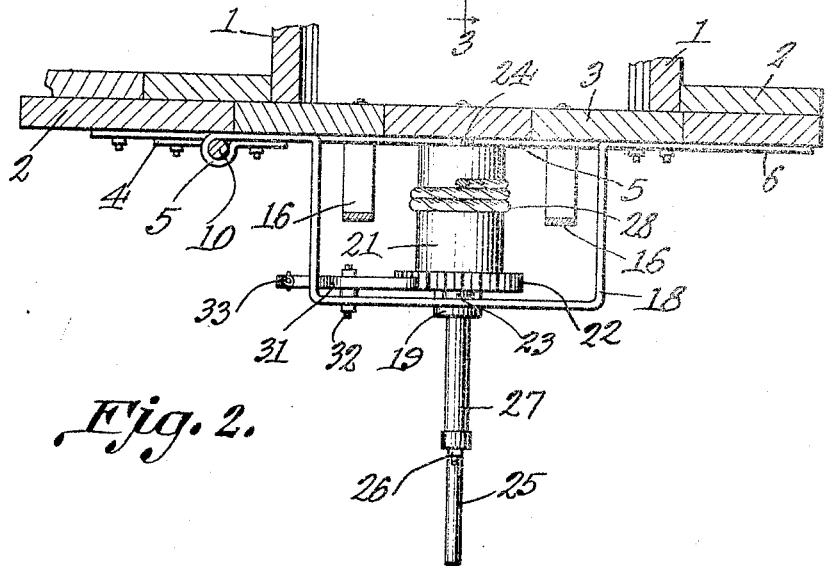
Figure 3:
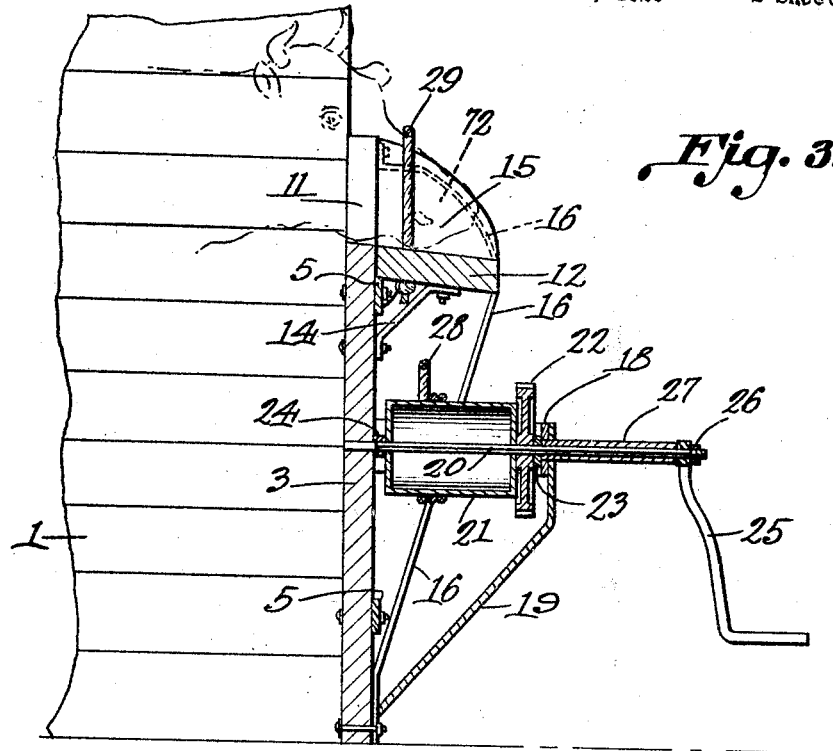
Figure 4:
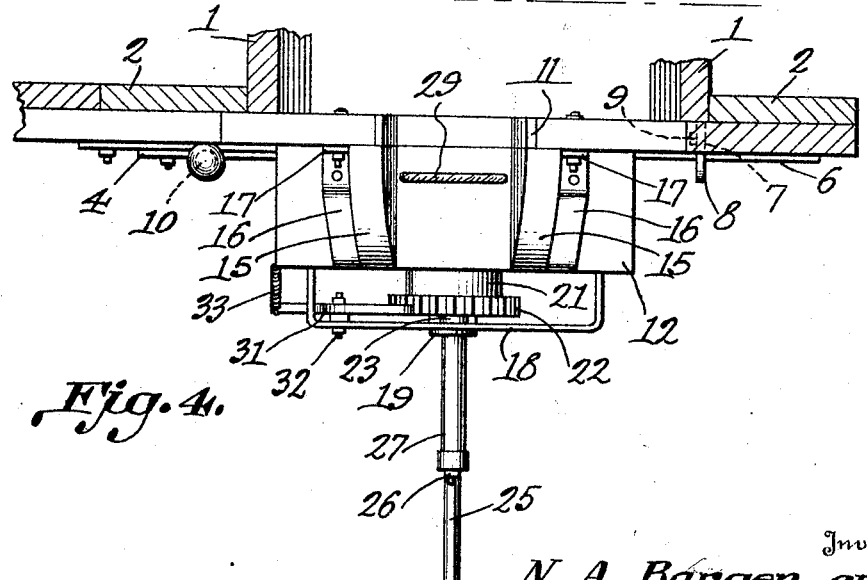

Figure 1 is a front elevation; Figure 2 is a section on the line 2—2 of Figure 1; Figure 3 is a section on the line 3—3 of Figure 1; Figure 4 is a section on the line 4—4 of Figure 1.

The numeral 1 marks the upright walls of a dehorning chute of any kind. The chute may include a front 2. The numeral 3 designates a horizontally swinging gate which forms a closure for the forward end of the chute. Hinge members 4 are mounted on the front 2. Hinge members 5 are mounted on the gate 3. The hinge members 4 and 5 are connected by a pin 10 or otherwise. The ends 6 of the hinge members 4 and 5 overlap the front 2. In this way, the movement of the gate 3 is limited as the gate is closed. There is a recess 7 in one edge of one part of the front 2. In the recess 7 is disposed a vertically swinging latch 8. The latch 8 is pivotally mounted on said part of the front 2, as shown at 9. The latch 8 is adapted to engage the end 6 of the uppermost hinge member 5, to hold the gate 3 closed.

There is a notch or seat 11 in the upper edge of the gate 3. A horizontal platform 12 is secured to the gate 3 and is located immediately below the notch or seat 11. The platform 12 is sustained by brackets 14 connected at their lower ends to the gate 3. Wings 15 project forwardly from the gate 3 and upwardly from the platform 12 and have lateral shoulders 72. The wings 15 and the platform 12 form a nose trough. Angle members 17 connect the wings 15 with the gate 3. The lower ends of braces 16 are secured to the gate 3. The braces 16 extend upwardly across the forward edge of the platform 12 and upwardly and rearwardly along the shoulders 72 of the wings 15. The upper ends of the braces 16 are secured to the gate 3.

The numeral 18 designates a U-shaped horizontal frame secured to the gate 3. The upper end of a prop 19 is secured to the intermediate portion of the frame 18. The lower end of the prop 19 is secured to the gate 3.

A horizontal shaft 20 is journaled in the gate 3, in the intermediate portion of the frame 18, and in the upper end of the prop 19. A drum 21 is secured to the shaft 20. The drum 21 is located within the frame 18. A ratchet wheel 22 is secured to the shaft 20 or to the drum 21 and is located at the forward end of the drum. A washer 23 is interposed between the wheel 22 and the intermediate portion of the frame 18. A washer 24 is interposed between the rear end of the drum 21 and the gate 3. The washers 23 and 24 are mounted on the shaft 20.

A crank 25 or other operating member is secured by a nut 26 on the outer end of the shaft 20. A tubular spacer 27 is mounted on the forward end of the shaft 20 between the crank 25 and the washer 23 and is journaled in parts 19 and 18. One end of a flexible element 28 is wound about the drum 21 and is secured thereto. The flexible element 28 passes upwardly through the platform 12 and is slidable therein. Above the platform 12, the flexible element 28 is formed into a loop 29. The loop 29 is located in the nose trough formed by the platform 12 and the wings 15. The end of the loop 29 is secured at 30 to the platform 12. A pawl 31 is pivotally supported at 32, intermediate its ends, on the forward portion of the frame 18. One end of the pawl 31 cooperates with the ratchet wheel 22 on the shaft 20. The lower end of a retractile spring 33 is secured to the outer end of the pawl 31. The upper end of the retractile spring 33 is secured to the platform 12, or elsewhere. The spring 33 constrains the inner end of the pawl 31 to cooperate with the ratchet wheel 22.

The nose of the animal to be dehorned is thrust through the seat or notch 11 in the upper edge of the gate 3 and is received in the nose trough formed by the wings 15 and the platform 12. The loop 29 is placed about the nose of the animal. By means of the crank 25 and the shaft 20, the drum 21 is rotated. When the drum 21 is rotated, the flexible element 28 is reeled on the drum, and the loop 29 is tightened about the nose of the animal. The pawl 31, under the impulse of the spring 33, clicks over the ratchet wheel 22 when the ratchet wheel is rotated to tighten the loop 29, and holds the ratchet wheel and the drum 21 against retrograde movement.

When the occasion for the use of the device has passed, the pawl 31 may be kicked out of the ratchet wheel 22, thus permitting the loop 29 to loosen, the nose of the animal being set free. When the gate 3 is opened, the animal may be driven out of the chute.

What is claimed is:—

1. In a device for holding animals during dehorning, a gate having a nose seat, a nose trough projecting forwardly from the gate and disposed about the seat, the trough comprising a platform and side wings, the wings having lateral shoulders, means for securing the trough to the gate, braces having their upper ends connected to the gate, the braces being extended downwardly over the shoulders, and rearwardly to the gate, means for connecting the rear lower ends of the braces to the gate, and holding means within the trough.

2. In a device for holding animals during dehorning, a gate having a nose seat, a nose trough projecting forwardly from the gate and located about the seat, a loop-shaped flexible element located within the trough, means for anchoring one end of the loop-shaped flexible element, the other end of the loop-shaped element extending downwardly through the bottom of the trough, a substantially horizontal frame projecting forwardly from the gate and located below the trough, a shaft journaled in the frame and in the gate, a drum carried by the shaft, the last-specified end of the flexible element being connected to the drum, a ratchet wheel on the shaft, and a pawl on the forward portion of the frame and cooperating with the ratchet wheel.

In testimony that we claim the foregoing as our own, we have hereto affixed our signatures.

NEWTON A. BARGER.
HARVEY F. BARGER.